United States Patent [19]

Takahashi et al.

[11] Patent Number: 4,548,835
[45] Date of Patent: Oct. 22, 1985

[54] METHOD FOR FABRICATING ELECTRODES FOR USE IN LEAD STORAGE BATTERIES

[75] Inventors: Katsuhiro Takahashi, Hirakata; Keiichi Watanabe, Amagasaki; Naoto Hoshihara; Hiroyuki Jinbo, both of Neyagawa, all of Japan

[73] Assignee: Matsushita Electric Industrial Company, Limited, Japan

[21] Appl. No.: 398,656

[22] Filed: Jul. 15, 1982

[30] Foreign Application Priority Data

Jul. 16, 1981 [JP] Japan ................... 56-111832
Jul. 30, 1981 [JP] Japan ................... 56-120286
Jul. 30, 1981 [JP] Japan ................... 56-120287
Jul. 30, 1981 [JP] Japan ................... 56-120288
Jul. 30, 1981 [JP] Japan ................... 56-120289

[51] Int. Cl.⁴ ..................... H01M 4/04; H01M 4/20
[52] U.S. Cl. ............................. 427/123; 427/58; 427/387; 429/217; 429/225; 429/227; 429/232; 141/1.1
[58] Field of Search ............... 429/217, 225, 227, 232; 141/1.1; 427/58, 126.1, 126.3, 123, 387

[56] References Cited

U.S. PATENT DOCUMENTS

| | | | |
|---|---|---|---|
| 3,751,301 | 8/1973 | Kilduff | 429/232 |
| 4,244,849 | 1/1981 | Saam | 428/451 |
| 4,315,829 | 2/1982 | Duddy et al. | 429/217 |
| 4,320,185 | 3/1982 | Bernstein et al. | 429/217 |

Primary Examiner—Richard Bueker
Attorney, Agent, or Firm—Lowe, King, Price & Becker

[57] ABSTRACT

A method for fabricating an electrode for use in lead storage batteries in which an aqueous emulsion of a silicone capable of forming an elastic, porous matrix on breaking of the emulsion, is contacted with a finely divided active electrode material at the stage of preparing an electrode paste, or after formation as an electrode. The contacted material is dried, so that the elastic, porous silicone matrix formed in association with and in intimate contact with the finely divided active electrode material. An aqueous dispersion of fluorocarbon resin can be further added to the paste, or an electrode having a fibrous network of fluorocarbon resin can be applied with the silicone emulsion. Fine particles obtained from the silicone emulsion can also be applied to a finely divided active electrode material.

25 Claims, 9 Drawing Figures

METHOD FOR FABRICATING ELECTRODES FOR USE IN LEAD STORAGE BATTERIES

BACKGROUND OF THE INVENTION

1. Field of the Invention

This invention relates to lead storage batteries and more particularly, to a method for manufacturing a novel and improved electrode for use in the batteries.

2. Description of the Prior Art

The charge and discharge cycle life of lead storage batteries is, in most cases, related to the bonding force of active materials per se in both positive and negative electrodes. Especially with a positive electrode, the particles of active material are apt to be broken into pieces during the course of repeated charge and discharge operations with the attendant drawbacks that the particle-to-particle bond is lowered, the particles are softened and fall off, and the fallen pieces deposit on various portions of the battery to cause short-circuit problems. Thus, the life cycle of the positive electrode is chiefly attributed to the bonding force between active material particles not only in the paste electrodes but also in the clad-type or tubular electrodes. On the other hand, the negative electrode suffers, aside from degradation owing to the contraction of active materials, from the disadvantage that the bonding force of active material particles becomes weakened in portions of the plate to which pressure is minimally applied.

In order to overcome the above drawbacks, it is usual to use binders: the electrodes are impregnated with dispersions of polyethylene, fluorocarbon polymers such as polytetrafluoroethylene (U.S. Pat. No. 3,630,781) and similar synthetic resins, by which active material particles are bonded together using these binder resins. However, imparting sufficient binding strength requires an increasing amount of resin, which impedes diffusion of electrolyte through the porous body, resulting in a considerable increase in resistance of the battery. Even though active materials or starting materials for the active materials are mixed with these resins to improve the binding force, the resins become fibrous or form a network structure in the inside of the particulate active materials. This is useful in binding large-size secondary particles together but cannot protect finely divided particles of active material. The network structure which has once been formed may be broken during the mixing, which involving difficulty in controlling the mixing conditions. For the protection of active materials of an electrode for use in lead storage batteries, it is ideal that while finely divided active material particles are protected, the protective structure is formed as porous, finally producing the binding force between secondary particles. Accordingly, there has been a demand for materials or methods for making protected electrode which meet the above requirements.

SUMMARY OF THE INVENTION

It is an object of the present invention to provide a method for fabricating electrodes for use in lead storage batteries which have an improved charge and discharge cycle life by application of an aqueous silicone emulsion to active electrode materials.

It is another object of the invention to provide a method for fabricating an electrode of the just-mentioned type in which active electrode materials are entrapped in a porous, elastic body or matrix by which high rate dischargeability is improved.

It is a further object of the invention to provide a method for manufacturing a porous electrode for use in lead storage batteries which can withstand vibrations while preventing electrode characteristics from lowering.

It is a still further object of the invention to provide a method for manufacturing an electrode using silicone rubber particles in which diffusion of an electrolyte into the electrode is ensured by the silicone rubber particles to improve the utilization efficiency of the active material particles, and stability of the electrode construction over a long term is also assured because strains caused by expansion and contraction of the active material during charge and discharge cycles are absorbed by the resiliency of the rubber particles.

In a broad aspect, there is provided according to the present invention a method for fabricating an electrode for use in lead storage batteries, which comprises contacting an aqueous emulsion of a silicone capable of forming an elastic, porous product on breaking of the emulsion with a finely divided active electrode material, prior to or after application to and drying on a support, applying the contacted finely divided active electrode material to a support when the finely divided active electrode material has been in a state prior to the application to, and drying on the support, and drying the contacted finely divided active electrode material, so that the water is removed from the aqueous emulsion to form an elastic, porous silicone rubber matrix in association with and in intimate contact with the finely divided active electrode material throughout the electrode.

In a more specific aspect, a finely divided active electrode material is contacted with an aqueous emulsion of a cold setting silicone rubber having a molecular weight of $10^3$ to $10^6$ and capable of forming an elastic, porous rubber matrix on drying, and dried at a temperature ranging from 10° to 200° C., preferably 40° to 150° C.

The active material may be applied with the emulsion after formation of a cell plate or may be mixed with the emulsion on mixing of necessary ingredients for the electrode formation.

Instead of using the aqueous emulsion, a powder of the silicone rubber of the type mentioned above which is obtained by contacting the aqueous emulsion of silicone with core particles, and drying and breaking the silicone-bearing particles into pieces, may be used in admixture with an ordinary paste or active material particles. The mixture is packed in or applied to a current collector.

Other objects and advantages of the invention will appear from the specification hereinafter and the accompanying drawings.

DETAILED DESCRIPTION AND PREFERRED EMBODIMENT OF THE INVENTION

As described before, the present invention is based on the discovery that when an aqueous emulsion of a silicone or its resin is contacted with active electrode materials and dried, an almost ideal protective construction or covering for the active material can be obtained. That is, when the water is driven off from the aqueous emulsion which is contacted with an active material in a wetting state, very porous silicone resin or rubber bodies become precipitated in association and in intimate contact with the active material. These bodies combine together not only to cover fine particles of the active material, but also to grow over secondary particles and groups of these secondary particles as if the active material particles are entrapped in porous capsules of different sizes lying one on another. Accordingly, even if the encapsulated active material particles are further finely divided on repetition of charge and discharge cycle, the resulting pieces do not escape from the capsules. Additionally, these capsules combine together so that the bonding of the groups of the secondary particles is held stable over long term. The silicone resin is so elastic that strains caused by expansion and contraction of active material are absorbed and the electrode is prevented from entirely breaking by the strains.

In general, silicones are known as water repellants and silicone oils dissolved chiefly in petroleum solvents are used for water-proof treatment of fibers or machine parts. When applied to active materials for lead storage batteries, silicone has such a great water repellency that it serves to impede diffusion of an electrolyte into the electrode, thereby lowering the discharge characteristic. Another disadvantage is that removal of any remaining solvent is not easy and when high temperatures are used for the removal, the active material used deteriorates.

On the other hand, an aqueous emulsion of silicone is advantageous over the oil-type silicones not only in that unfavorable components are not contained, but also because the produced silicone polymer product is porous and has such minimal in water repellency that the degree of impeding diffusion of an electrolyte into electrode is small.

Usually, an aqueous silicone emulsion is made of a two-component system of a master emulsion and a catalyst which are mixed together at the stage of application. In the practice of the invention, lead or oxides or sulfates thereof in active materials are allowed to dissolve out in very small amounts under neutral or alkaline conditions to provide lead ions. The lead ions are considered to act as a curing or setting catalyst and thus additional catalysts are not necessarily needed. In this connection, however, in order to impart elasticity to the protective layer formed from the aqueous silicone emulsion, an alkaline catalyst such as KOH, CsOH, $(CH_3)_3SiOK$ or the like is used, similar to the case of producing silicone rubbers, so as to increase the degree of polymerization and cause the rubberization to proceed on contact with active material particles. However, in order to cause uniform rubberization to proceed, high temperatures of about 150° to 200 ° C. are necessary and do not necessarily conform to the treating conditions of active material. Moreover, addition of potential oxidizing agents for curing may result in formation of byproducts such as $CO_2$, which react with an active material to change its nature. Although it is not impossible to prepare a long-chain silicone polymer of uniform quality, the preparatory conditions are not necessarily coincident with handling conditions of active material.

We have found that use of a one-component system aqueous emulsion of a cold setting silicone rubber of the specific type as the aqueous silicone emulsion is effective in the case of main electrodes for lead storage batteries as one of measures for overcoming the above drawbacks though any aqueous silicone emulsions may be usable. The specific type of cold setting silicone rubber aqueous emulsion useful in the practice of the invention is an emulsion of a silicone polymer or resin having long chains. This type of the aqueous emulsion, its preparation, and preparatory conditions are particularly described in Japanese Laid-open patent application Nos. 56-24446 and 56-16553 which are incorporated herein by reference. All the aqueous emulsions of silicone resins with or without inorganic matters such as colloidal silica described in these references, which meet the requirements of the present invention, can be used in the practice of the invention and examples of these silicone resins include, as described in these references, hydroxylated polydiorganosiloxanes having a monohydrocarbon group having not larger than 7 carbon atoms such as methyl, ethyl, propyl, butyl, isopropyl, pentyl, hexyl, vinyl, cyclohexyl and phenyl, and a 2-(perfluoroalkyl)ethyl group having not more than 7 carbon atoms such as 3,3,3-trifluoropropyl and 2-(perfluorobutyl)ethyl. However, any one-component system aqueous silicone resin emulsions which can form a porous, elastic polymer matrix on breaking the emulsion is preferably be used in the present invention without limitation to those specified above. This type of emulsion contains almost pure silicone and is capable of forming a very elastic and porous silicone polymer mass or matrix, without any catalyst for crosslinkage, on removal of the water. This emulsion has properties such that when it is contacted with an active material and dried, a porous layer is formed on the surface of the active material and the produced silicone rubber bodies readily and firmly combine together to form a matrix. The reason why the emulsion has such properties as mentioned above is not known but it is considered as follows: the emulsion is different from a master emulsion in which bonding proceeds by crosslinking or condensation by the action of catalyst, the silicone product polymerized to a level of elastomer develops a strong bonding force during the step where the water is removed or driven off from the emulsion.

With the one-component system aqueous emulsion of a cold curing silicone resin, it is not necessary to expose active material to severe polymerization or rubberization conditions of silicone, so that the active material does not degrade because of attack of byproducts formed during the course of the rubberization reaction as may be experienced in the master emulsion system. This allows the aqueous emulsion to contact with active material and dry under ordinary and thus mild conditions for an electrode for lead storage battery.

The cured silicone rubber product which has been formed on the surface of for active material by removal of water from the emulsion shows different properties depending on the pH of the system in which the emulsion is contacted with an active material. For instance, when dried from an acidic system using, for example, sulfuric acid, the resulting porous silicone rubber product is rather weak in bonding force and shows a slight degree of swelling, with a reduced tendency that the porous silicone rubber will serve to increase the resistance of an electrolyte in the electrode. In neutral to alkaline regions, the obtained porous silicone rubber has high elasticity and high bonding strength and use of a strong alkali such as caustic potash results in high bonding force and a slight degree of swelling. This difference in properties of the final cured silicone rubber product can be properly utilized depending on the type of lead storage battery as to whether importance is attached to either the cycle life or high rate dischargeability. In general, the pH is preferably in the range over 7 in view of mechanical strength, cycle life and elasticity. To make the degree of alkalinity or pH of the treating system too high from the first is not necessary because the pH increases as the removal of water proceeds. Presence of ions of alkali metals such as Li, Na, K or the like during the course of removing the water from the emulsion is effective even in an amount of several to several tens ppm based on the weight of solid silicone and such alkali metals are generally contained in amounts ranging from 10 ppm to 10% by weight of the solid silicone. Presumably, this is because when fine particles of a silicone rubber are combined together as the water is removed, the alkali metal ions serve as a curing catalyst for the rubber.

The polymer matrix produced from the silicone rubber emulsion does not redissolve in water once dried and when it is again contacted with the emulsion and dried, a freshly produced polymer from the contacted emulsion combines well with the polymer matrix and grows into a larger size.

The aqueous silicone emulsion can be contacted with or applied to active material particles at any stage of the active material, i.e. (1) lead or lead compounds or a mixture thereof, (2) products of lead or lead compounds or mixtures thereof obtained by reaction with water and sulfuric acid added as required, and (3) $PbO_2$ and Pb obtained by applying the material of (1) or (2) to a support and subjecting it to formation and charging. After the contact or application, the emulsion is dried to form a polymer matrix associated with or intimately contacted with the particles. The lead particles covered at any stages are finally added to the electromotive reaction and therefore all the materials including the starting materials and compounds taking part in the final electromotive reaction are generically called "active material" herein.

As described above, although active materials may be in any states in the practice of the invention, the porous structure of a finally formed electrode differs depending on the stage where the aqueous emulsion is applied, with different battery characteristics.

The aqueous emulsion is typically applied by impregnating in an electrode (including a fundamental unit of electrode) in which an active material has been applied as a paste or the like to a support and dried, and drying the impregnated electrode. This method can be widely applied to any known type of electrode including a pasted electrode which is obtained by applying or spreading a paste of active material onto a grid and drying, a clad-type or tubular electrode in which a powder of lead or lead oxide is packed in a porous tube, or a modified clad-type electrode in which a paste or slurry of active material is packed in a porous tube. This typical method has the advantage that formulation of electrode material can arbitrarily be chosen and after formation of an electrode with a porous mass of active material, a protective structure of silicone rubber is formed to improve the cycle life of the electrode. Accordingly, the cycle life can be improved without substantial changes in the chosen active material in properties. As a matter of course, even though the emulsion is applied to an electrode prior to formation, chemical formation and charging is possible in a subsequent stage and hence the aqueous silicone emulsion can be contacted with an electrode prior to or after chemical formation of the electrode.

As described before, the aqueous emulsion useful in the present invention is an emulsion of a silicone rubber having a molecular weight of $10^3$ to $10^6$ and is commercially available, for example, from Toray Silicone Co., Ltd. under the name of Toray Silicone SE 1980 Aqueous Coating. In practice, the emulsion is commercially available as a 45% emulsion and is applied in a wide range of solid contents, say, 0.045 to 45% though a relatively low concentration is preferable since the silicone rubber can readily be infiltrated into pores of active material particles. Preferably, the concentration of the aqueous emulsion is in the range of 0.1 to 5%, as solids. which may more or less vary depending on the manner of application.

In order to ensure the protective performance, the silicone rubber emulsion is applied in an amount of 0.1 to 20% by weight, preferably below 10% by weight, of a powder of lead or lead compounds calculated as solids.

The aqueous silicone rubber emulsion shows good infiltration into a porous material and may also be applied to an electrode to which has been already applied an emulsion or dispersion of other resins or may be used in combination with such an emulsion or dispersion as mentioned above thereby forming protective layers in the inside of a porous material as will be described hereinafter.

The aqueous silicone emulsion may be also applied at the stage of preparing a mixture or paste mainly composed of lead powder, water and sulfuric acid. This mixture or paste is applied to a support and dried to obtain particles of lead entrapped or encapsulated in a porous, continuous silicone rubber matrix. By this procedure, not only is the active material packed very porously in the support, but also the reinforcing effect is produced on drying. The resulting electrode is porous and excellent in high rate dischargeability and also in cycle life characteristic.

In general, a paste for lead storage battery is prepared by first pre-mixing predetermined amounts of lead powder and water, dropping sulfuric acid having a specific gravity of 1.20 to 1.45 into the mixture over a time of 5 minutes to 1 hour or more while mixing, and after completion of the dropping, further mixing the mixture.

In this connection, when the aqueous emulsion is added prior to a stage where sulfuric acid is dropped, the polymer matrix obtained after drying becomes more porous and the complete of electrode is improved in strength.

As is well known in the art, the paste has generally a fundamental composition of about 70 to 90 wt% of lead powder (by which is meant a powder of lead or lead compounds), about 9 to 20 wt% of water and about 1 to 10 wt% of sulfuric acid so that a paste density is in the range of 3.0 to 5.0 g/cc. The aqueous silicone emulsion is added to the paste in an amount of 0.1 to 10 wt% of the lead powder calculated as the solid component.

In order to further improve the porosity and electrode strength as cured, the paste composition including the aqueous silicone emulsion may be admixed with a water-absorptive material which is able to absorb water several tens times the volume of the material per se under approximately neutral conditions. Examples of such materials include polyethylene oxide, acryl polymer, acrylonitrile fibers applied with acrylic acid and the like. These materials are generally used in an amount of 0.01 to 0.1 wt% of the composition in order to assure their effect.

The reason why the use of the aqueous silicone emulsion in the mixing stage is effective in improving the porosity and the electrode strength is not fully understood but is considered to be as follows.

On mixing, active material particles on which the silicone emulsion is deposited are exposed to the air, so that part of the water is removed to permit the silicone polymer to precipitate locally. This is confirmed by the fact that a more porous polymer matrix is formed in the electrode under more violent agitation where the air is drawn into a mixing composition to a greater extent. Once formed, the silicone rubber matrix does not dissolve in water but adsorbs thereon a silicone material in the emulsion to allow further deposition of a silicone rubber on the previously formed matrix. In this manner, the silicone polymer matrix grows while locally associating and intimately contacting with active material particles in the mixture. As the result, the active material particles apparently become porous, paving the way for packing in a highly porous manner.

In case where the aqueous emulsion has been previously added to the paste composition to which sulfuric acid is added, lead powder reacts with water and sulfuric acid to form lead sulfate, or its monobasic salt, tribasic salt or tetrabasic salt or hydrides thereof. During the course of the formation, local dissipation of the water owing to the heat of reaction and the heat of friction takes place, so that masses of the silicone rubber are formed and creep into crystals of the active material which is being converted into the corresponding salt, thus increasing the apparent porosity of the active material particles. It is believed that the water absorptive materials serve to catch or absorb the water being released from the inside of the active material particles at portions away from the particles. Thus, the active material particles are observed as porous and can be porously packed in or on a support.

The strength of the electrode is not completed in this stage. It is necessary to remove the water from the paste by drying, by which a silicone polymer matrix is so formed that a single particle of active material and a plurality of the particles are porously encapsulated. At this time, the active material particles are bonded together in the polymer matrix, not during the mixing. This is advantageous in that since there is no fear that the bonding as would have once been produced during the mixing would be broken again during the mixing, the strength of the electrode is not lowered by the mixing. On drying, the silicone polymer matrix grows into a larger-size matrix while combining with locally formed silicone polymer precipitates during the mixing. Silicone polymer precipitates which have crept into particles of active material in the course of the conversion of the active material serve to develop more powerful reinforcement of the electrode in combination with the silicone polymer matrix produced on drying. With a silicone of the type which cures by crosslinkage or a condensation reaction, such a powerful effect is produced only when satisfactory rubberization proceeds. In this respect, the one-liquid system cold setting silicone rubber emulsion using a long-chain silicone material which has already been rubberized to a certain extent is much more effective and reliable in the reinforcement and formation of pores than the known type. The drying temperature is not critical if active materials are not adversely affected or degraded by the temperature and the drying of the emulsion is facilitated, but is generally in the range of 10° to 20° C., preferably 40° to 150° C.

In the pasted or the clad-type electrode illustrated above, there has been described the paste composition which is composed of lead powder, water and sulfuric acid but other ingredients such as fluorocarbon resins may be added.

As is well known in the art, an attempt has been made to make a high capacitance electrode using low density pastes but there was a limitation in achieving both high capacity and long cycle life. As one of measures for overcoming the problem, there has been proposed, such as in U.S. Pat. No. 3,630,781, a method using a fluorocarbon resin such as polytetrafluoroethylene, fluoroethylene-fluoropropylene copolymer or the like which is added in the form of a dispersion to paste compositon.

The paste composition to which a fluorocarbon resin dispersion is added has a number of advantages as discussed in the above-indicated U.S. patent but has the following disadvantages.

1. During mixing, a fluorocarbon resin is precipitated as an interconnected fibrous matrix serving to reinforce the elctrode material. However, this mixture is so high in plasticity that it often becomes difficult to spread or apply the mixure onto a grid or the like support.

2. The once formed interconnected fibrous matrix may be broken during mixing and thus even though fibers are present in the mixture, the protective action of the broken matrix lowers.

3. The mesh size of the interconnected matrix is much larger than the particle size of active material. When active material is rendered finer in size during charge and discharge cycles, the finer particles tend to fall off through the matrix. Accordingly, it becomes necessary to increase the strength of the active material particles themselves.

In order to overcome these disadvantages, it is very effective to add the aqueous silicone emulsion to a paste composition including a dispersion of fluorocarbon resin when the paste is prepared. The resulting paste is packed in or applied to a support and dried under conditions indicated hereinbefore.

As having been discussed, the aqueous silicone resin emulsion is converted into a continuous silicone polymer matrix by the removal of the water. The continuous silicone polymer matrix protects active material particles as if the particles are contained in interconnected microcapsules. Accordingly, even when the particles of active material are rendered finer in size, the protective arrangement of a course meshwork of the interconnected fibrous matrix of fluorocarbon resin and a finer meshwork of the silicone polymer matrix serves to hold the finer particles therein. That is, irrespective of breakage of the once formed network of fluorocarbon resin, the polysiloxane polymer matrix which is growing in intimate contact with secondary particles of active material takes in part of the network of fluorocarbon resin and forms a macro- and micro-reinforcing structure as a whole.

Another advantage is that when the mixing is effected in coexistence of a dispersion of fluorocarbon resin and the aqueous silicone emulsion, the elasticity of the paste lowers as compared with that of a paste to which a fluorocarbon resin alone is added, with the workability being improved. This lowering effect is remarkable especially when the aqueous silicone resin emulsion is added immediately after addition of a fluorocarbon resin dispersion or before the network structure of fluorocarbon resin does not form sufficiently. Since the network structure of the fluorocarbon resin is observed in the final paste, it seems that the aqueous silicone resin emulsion does not merely suppress the fibrillation of fluorocarbon resin, but the lowering in elasticity of the paste has some relation to local precipitation of the silicone resin during mixing. This local precipitation is facilitated by the coexistence of the afore-indicated water-absorptive material such as polyethylene oxide, giving a good influence on the cycle life and ensuring porous packing in support.

Thus, the aqueous silicone resin emulsion is effective in improving workability and applicability of the paste using a fluorocarbon resin dispersion. In the event that the network structure of a fluorocarbon resin used is broken during the mixing as will be frequently experienced in known pastes using such resins, the silicone resin precipitating among secondary particles serves to combine the broken structure and fine particles of active material are firmly protected by the porous silicone resin matrix. That is, the aqueous silicone resin emulsion is able to form a hitherto unknown protective structure for both fine active material particles themselves and groups of these fine particles.

The amount of the fluorocarbon resin based on lead powder is not critical but when too great an amount is used, the packing performance and the high rate dischargeability lower, though depending on the amounts of water and sulfuric acid used, so that it is general to use 0.05 to 1 wt% based on lead powder. Within this range, a relatively coarse network structure is obtained and in this condition, the encapsulating effect on the fine active material particles produced by using the aqueous silicone emulsion becomes more remarkable while the particles are reinforced with the coarse network structure of fluorocarbon resin. The amount of the silicone resin is favorably in the range of 0.05 to 5 wt% of the lead powder. The amount is determined under conditions where the water in the paste is slightly discharged to the outside at the time of the packing. Accordingly, it is preferable that the amount is in the range of 0.5 to 1 wt% when the difference in density of the paste prior to and after the packing ranges from 0.2 to 1 and is in the range of 1 to 5 wt% when the difference ranges over 1, within which range the cycle life of the elctrode is improved while suppressing its voltage drop.

As a matter of course, the electrode made of a paste using a fluorocarbon resin dispersion may be applied with an aqueous silicone resin emulsion, by which the inherent drawbacks of the known electrode can be eliminated, i.e. fine particles of active material can be protected by fine structures of the silicone resin matrix. In this case, when the water is removed, the long-chain silicone polymer precipitates and grows as primary particles, secondary particles, groups of the secondary particles having finer pores and higher porosity than active material particles while associating and intimately contacting with active material particles, and the precipitates combine together to hold the particles of active material by the strong rubbery elasticity. Additionally, when the silicone resin precipitates grow and contact with the fibrous network of the fluorocarbon resin which has been formed at the mixing stage, the growth continues involving part of the fibers irrespective of the breakge of the network. As the result, the entirety of the active material particles are firmly held or reinforced by the microstructure and the macrostructure extending over groups of the secondary particles, of the silicone resin.

In this manner of application of the aqueous silicone resin emulsion, such conditions as pH, amount and the like as described with reference to the electrode containing no fluorocarbon resin are likewise applied. Accordingly, the aqueous silicone resin emulsion can be applied to the electrode containing the fibrous network of fluorocarbon resin, which electrode having been either subjected to chemical formation or not subjected to such formation. In this connection, however, because the chemical formation involves breakage of part of the secondary particles owing to generation of gases upon charging, thereby causing the broken particles to escape from the meshwork of the fluorocarbon resin, and it is difficult to treat the electrode after assembling of a battery, it is preferable to apply the aqueous silicone resin emulsion to an electrod prior to formation. Needless to say, where the formation and washing is effected in a separate vessel as in the case of a large-size electrode, the application after formation is possible.

In the above embodiment, the aqueous silicone resin emulsion has been applied to the electrode which is made of a composition of an active material, water, sulfuric acid and a dispersion of fluorocarbon resin. On the contrary, the electodes obtained in accordance with the foregoing embodiments of the invention which comprises the porous silicone resin matrix, may be applied with a dispersion or emulsion or a resin which does not combine with or is inert to the silicone resin. The resulting electrode is resistant to shock and also to violent generation of gas without impeding diffusion of an electrolyte into the inside of the elctrode.

The resins useful in this embodiment are those which show little affinity for silicone resin and include, for example, polyolefins such polyethylene, polypropylene, and the like, fluorocarbon resins such as polytetrafluoroethylene, tetrafluoroethylene-axafluoropropylene copolymer and the like. These resins are used in the form of a dispersion or emulsion.

The porous mass of active material particles covered with the porous silicone resin layer is barely infiltrated therein with the dispersion or emulsion as mentioned above. When the dispersion or emulsion is broken, the inert resin tends to precipitate on or near the surface of the electrode. This type of electrode has the advantage that active material particles in the electrode are porously covered with the silicone resin layer, so that even though the secondary particles are broken into pieces, the pieces hardly release from the electrode.

As described hereinbefore, the aqueous silicone resin emulsion may be applied at any stage of fabrication of an electrode. The simplest manner of applying the silicone resin emulsion includes impregnating the emulsion in a chemically formed or non-formed electrode. This type of electrode may involve a slight degree of lowering in electrode characteristics because of formation of the surface resin layer and, has particular utility, for example, in the field where there is no requirement for high rate dischargeabilty such as in electromobiles or tractors. However, for setting-up of a power transmitting machine using a small-size engine, certain levels of high rate dischargeability and shock resistance are needed. In this case, the aqueous silicone resin emulsion is admixed with an active material on mixing of the electrode composition, followed by packing and drying, by which because of local precipitation of the silicone resin on the mixing, a highly porous electrode is obtained as described hereinbefore. When this highly porous electrode is applied with a dispersion of a fluorocarbon resin or an emulsion of polyethylene, there is obtained an electrode which is excellent in dischargeability and is reinforced in the surface portion thereof.

In the foregoing embodiments, an aqueous silicone resin emulsion is applied to an electrode composition or an electrode which has been chemically formed or not formed. It has been also found that an aqueous silicone resin emulsion is admixed with particles serving as cores in the emulsion and dried by which particles covered with an elastic, porous silicone resin layer can readily be obtained. When used in combination with active material particles, these particles, which are covered with the silicone resin layer, serve not only to form the path of an electrolyte in the electrode, but also play a role of absorbing the strains produced due to the variation in volume of the active material particles on repetition of charge and discharge cycle, thus suppressing the active material particles from softening and falling off.

The reason why the core particles are used is that the product obtained by drying the silicone resin emulsion is an integrally combined material and is very difficult to powder. In order to obtain particles of relatively uniform sizes, the core particles in the wet state are sprayed or dispersed in a hot atmosphere on drying. That is, the silicone resin in the wet state has almost no bonding force and thus the dispersion of the core particles becomes easy. The drying is effected generally in the range of 40° to 50° C. The resulting silicone resin layer does not again dissolve in water and the covered particles can be handled as insoluble particles in a subsequent stage where water is used.

The core particles are most simply those which are insoluble in water or an electrolyte and include, for example, inorganic particles such as carbon and organic particles such as particles of organic polymers including polyesters. Alternatively, particles of metals or compounds which are kept as solid in the silicone resin emulsion but dissolve in strong acids or alkali, or which are solid in water but dissolve in organic solvents, are used to form the porous silicone layer thereon. After formation of the silicone layer, the core particles are removed by dissolution to obtain porous elastic particles of almost pure silicone resin alone. Still alternatively, active materials per se or their intermediate products may be used as the core particles, but once, dried particles are relatively poor in conductivity because the core particles are covered with the silicone layer. Accordingly, even though such active material particles are used as the core, their conductivity can hardly be expected.

The silicone resin particles including those in which the core particles are contained may be admixed with particles of lead or lead compounds and packed in a fibrous glass or plastic support to give a clad-type electrode. Alternatively, the silicone resin particles are admixed with an electrode composition comprising powder of lead or lead compounds, water and sulfuric acid and is applied to a grid to give a pasted electrode or applied to fiber support to give a clad-type electrode. When packed, these silicone resin particles allow easy infiltration of an electrolyte beause of their porosity and absorption of strains caused by the variation in volume of active material particles because of their elasticity.

The silicone resin particles useful in the practice of the invention have an average size ranging from 50 to 1000 microns, preferably 100 to 200 microns. These particles can be obtained by applying a diluted emulsion of silicone resin having a concentration of 0.1 to 45 wt% to core particles with a size of 20 to 400 mesh, and drying at a temperature of 10° to 200° C., preferably 40° to 150° C. while dispersing or distributing, for example, on a rotary disc of high revolution speed. The particle size can be varied by suitably controlling the size of the core particles and the concentration of the emulsion.

The silicone resin particles are generally used in an amount of 0.1 to 10 wt% of lead or its compounds.

The present invention is particularly described by way of examples.

EXAMPLE 1

In order to make clear the effect on positive electrodes for a lead storage battery, there is shown application of the present invention to an electrode of relatively short cycle life using a non-formed plate which is obtained by applying a paste of a low density of 3.4 g/cc to a grid and drying.

A one-component system cold setting silicone rubber emulsion (having a molecular weight of $10^4$ to $10^6$, solid content of 45 wt%) was provided, and diluted and adjusted in pH to given levels, respectively. Each of the diluted or adjusted emulsions was used to impregnate the non-formed plate therein and dried at a temperature of 100° C. ±10° C. Four electrodes obtained as described above were assembled with negative electrodes obtained by an ordinary manner to give a storage battery with a nominal rating of 50 Ah. This battery was subjected to a repeated cycle of charge and discharge to determine its cycle life and also determine an influence on the diffusion of an electrolyte from the voltage drop at the charge and discharge cycle.

More detailed test conditions were as follows.

In order to determine the effect of an alkali metal, a 1:50 dilution of the stock emulsion was provided as A, to which were, respectively, added 10 ppm and 100 ppm of $Na_2SO_4$ as $B_1$ and $B_2$.

As for the pH, after adjustment of the pH of the 1:50 dilution of the emulsion to 14 by the use of NaOH, NaOH and $H_2SO_4$ were used to adjust the dilution to an acidity of 2 moles sulfuric acid to give $C_1$ emulsion, to the pH levels of 1, 7 and 14 to give Chd 2, $C_3$ and $C_4$ emulsions, respectively and to an alkalinity of 2 moles NaOH to give $C_5$ emulsion. Additionally, a reference electrode to which no emulsion of silicone resin was applied was designated as D.

As for dilution, the stock emulsion was adjusted to a pH of 14 and was diluted to a 1:1, 1:10, 1:100, 1:1000 and 1:10000 and designated as $E_1$, $E_2$, $E_3$, $E_4$ and $E_5$, respectively.

Figure 1:
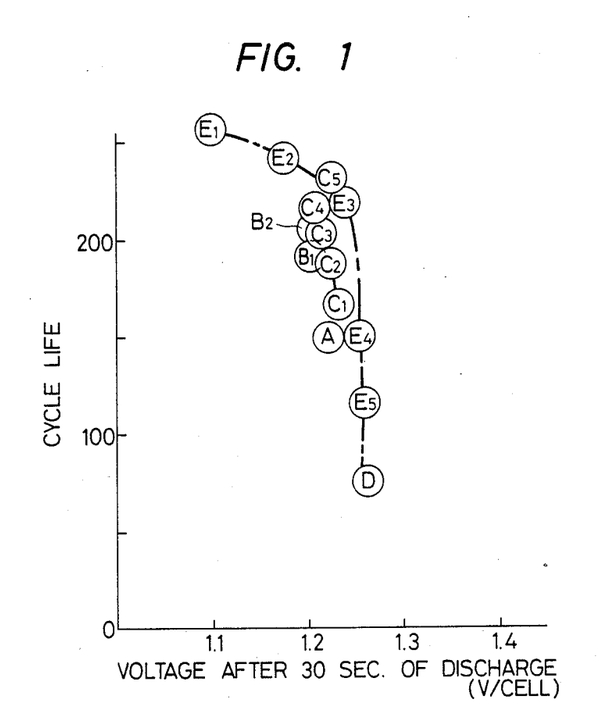
FIG. 1 is a graphical representation of a relationship between the voltage at the time of high rate discharge of lead storage batteries using different types of electrodes and the cycle life.

The voltage drop at the time of high rate discharge was determined as a voltage just 30 seconds after discharge at $-15°$ C. at a current of 300 A and the cycle life was defined as the number of charge and discharge cycles obtained when the discharge of 2.5 hours and the charge of 3 hours were repeated at the 3-hour rate until the discharge of 2.5 hours became impossible. The relation between the high rate discharge voltage and the cycle life of the tested electrodes is shown in FIG. 1.

As will be apparent from the figure, the electrodes using the aqueous silicone resin emulsions are all improved in cycle life over the reference electrode D. Upon comparing the electrodes A, $B_1$ and $B_2$, it will be seen that the alkali metal is effective in improving the cycle life. From the results of the group of $C_1$ through $C_5$, it will be found that the alkaline conditions give more excellent cycle life than the acidic conditions, and the voltage drop is larger at the acidic side than at the alkaline side though it increases even under alkaline conditions with an increase of the alkaline concentration. This supports the relation with the swelling occurring at higher alkaline concentrations as described hereinbefore. The results of the E series reveal that the high rate dischargeability and the cycle life are well balanced at an optimum level of dilution, suggesting that the level of dilution should be chosen depending on the intended use of a final battery.

EXAMPLE 2

In this example, application of an aqueous silicone resin emulsion to an electrode composition is described.

Pastes having difference densities ranging from 3.0 to 5.0 g/cc were prepared using a lead powder having a degree of oxidation of 50 to 90%, water and sulfuric acid. The paste density was varied using different ratios of water and sulfuric acid. An aqueous silicone resin emulsion was then added to the pastes at different mixing stages. The aqueous silicone resin emulsion was a one-component system, cold setting pre-cured silicone rubber emulsion having a solid content of 45 wt% used as a stock emulsion.

The lead powder and water were first pre-mixed, into which a predetermined amount of an aqueous sulfuric acid solution having a density of 1.35 was dropped over 5 to 30 minutes while mixing, followed by further mixing to give a paste.

The pastes to which the silicone resin emulsion was added were classified as follows in accordance with the adding and mixing conditions of the aqueous emulsion.

That is, addition of the emulsion at the pre-mixing stage was designated as F, addition of the emulsion at completion of the dropping of the sulfuric acid solution was as G, addition of polyethylene oxide along with the emulsion at the pre-mixing stage was as H (amount of polyethylene oxide: 0.2 wt% based on the lead powder), and addition of no emulsion was as I. The silicone resin content was 0.6 wt% of the lead powder and the stock emulsion was adjusted in pH to 14 by the use of NaOH.

Each of the pastes obtained was packed or filled in a commercially available grid using a packing device in a thickness of about 2 mm followed by aging and drying as usual to give pasted electrodes. Thereafter, four pasted electrodes as a positive electrode and five negative electrodes were used to constitute a lead storage battery, which was subjected to the high rate discharge and cycle life tests. In the high rate discharge test, a battery with a nominal rating of 45 Ah was used to determine a discharge time of a final voltage of 1 V/cell at $-15°$ C. and 300 A. The cycle life was determined as the number of cycles obtained before 60% of an initial capacity was reached when repeating the discharge at 8 A to a level of a final voltage of 1.7 V/cell and the charge at 8 A for 6 hours.

The electrodes obtained according to the invention were found to contain dimethylpolysiloxane as the product.

With the electrode I which was not applied with the silicone resin emulsion, the paste was attached to the lower belt in the range of the paste density below 3.5 and a plate could not be obtained. In contrast, the pastes of the invention were useful in making the plate even in the low density range.

Figure 2:
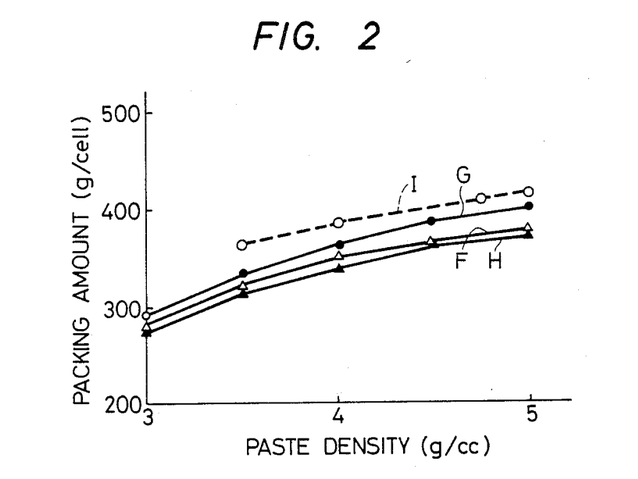
FIG. 2 is a graphical representation of a relationship between the paste density and the packing quantity of each of several electrodes.

The dry weight of the active material in plate per cell is shown in FIG. 2. The results of the figure show that when packed at the same level, the paste compositions using the silicone resin emulsion according to the invention are packed more porously.

Figure 3:
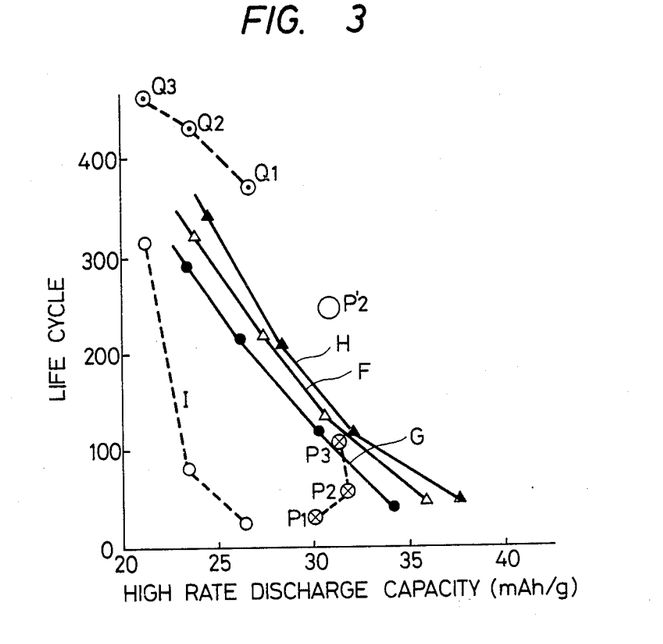
FIG. 3 is a graphical representation of a relationship between the cycle life and the high rate discharge capacity per unit weight of active material.

This porous packing gives an influence on the discharge characteristics at the time of high rate discharge. The discharge capacity and cycle life of each of the cells using the respective electrodes indicated before per unit weight of the active material at $-15°$ C. and 300 A are shown in FIG. 3. From this figure, it will be seen that the batteries or cells using the electrodes obtained according to the invention are higher, as a whole, in the discharge capacity per unit weight of the active material at the time of the high rate discharge. This reveals that porous packing contributes to increase the utilization efficiency of the active material in the high rate discharge. In addition, a tendency that the cycle life is considerably lowered when the electrode is formed more porously as in I is involved, but the degree in lowering of the cycle life is very small in view of the degree of the improvement in the utilization efficiency. In other words, there is provided, according to the invention, one of the expedients for improving both the high rate dischargeability and the cycle life, which has been hitherto considered as difficult.

Further, the amount of the silicone resin was changed using the conditions of H and paste composition comprised of 210 cc of water and 110 cc of sulfuric acid having a specific gravity of 1.35 per kg of lead powder. That is, the contents of the silicone resin based on the weight of the lead powder were changed at 0.01, 0.05, 0.1% ($J_1$–$J_3$) and 5, 10 and 20% ($K_1$–$K_3$). These pastes were applied in the same manner as described above to determine the cycle life and the high rate dischargeability. The results are shown in FIG. 3. These results demonstrate that the packing in high porosity is possible in such a wide renge of the amount of the silicone resin with the cycle life being improved. The amount of the silicone resin is varied depending on the intended use as to whether the high rate dischargeability or the cycle life is of importance. Moreover, the prolonged cycle life is obtained in the packing range of high density which is actually utilized only at low rates.

The electrode obtained from the paste $J_2$ which ensured porous packing but was still insufficient in the cycle life was immersed in a 1:20 dilution of the stock emulsion and dried. The cycle life and the high rate dischargeability of the electrode, designated as $J'_2$, are also shown in FIG. 3, from which it will be seen that the cycle life was remarkably improved without showing a substantial lowering of the high rate dischargeability. That is, where the amount of the silicone resin used at the mixing is insufficient, the silicone resin emulsion may be applied to the once finished electrode and dried to obtain a long life electrode. The application of the emulsion may be repeated, if necessary, to improve the cycle life.

As regards the negative electrode, an active material is completed in the form of spongy lead and is thus very conductive and a larger number of electrodes are used than positive electrodes, so that no substantial difference is brought about with regard to the high rate dischargeability.

Accordingly, the cycle life characteristic was examined using a combination of an existing electrode treated under the conditions of $C_4$ or the electrode $J'_2$ formed as a negative electrode and the positive electrode of $C_4$. As a result, it was found that at the time of 220 cycles, a battery using known negative electrodes showed a sufficient negative capacity but the plate at the end side on which a plane group pressure was lightly imposed involved deterioration of the active material. In contrast, the negative electrodes obtained according to the invention were not damaged at all and their strength was found to be improved.

It will be noted that there can be used as the aqueous silicone resin emulsion, for example, a commercially available Toray Silicone SE 1980 aqueous coating (one-component system cold setting silicone rubber emulsion) and hence emulsifiers, surfactants and some impurities as usually contained in commercial products are considered to give no substantial influence on battery performance.

EXAMPLE 3

According to the usual procedure, 1 kg of lead powder (having a degree of oxidation of 50-90%) and 200 cc of water were pre-mixed, into which 100 cc of sulfuric acid having a specific gravity of 1.35 was dropped over about 10 to 30 minutes, followed by finally mixing for 5 to 15 minutes to prepare the following three pastes A-3, B-3, C-3: an aqueous dispersion of polytetrafluoroethylene was further added at the pre-mixing stage in an amount of 0.5 wt% of the lead powder A-3; a one-component system, cold setting silicone rubber emulsion and an aqueous dispersion of polytetraethylene were further added at the pre-mixing stage each in an amount of 0.5 wt% of the lead powder B-3; and no further emulsion of dispersion was added C-3.

The paste A-3 was highly elastic and spongy and was very hard to apply to a grid. The paste C-3 was readily applied but was attached to a sheet for the grid and it was difficult to separate the grid from the sheet. The paste B-3 was slightly stiffer than the paste C-3 and was readily separable from the sheet. Although the fluorocarbon content was at the same level as that of the paste L, the applicability or packing ability of the paste M was very good with good elasticity and good separability from the sheet.

Each of the pastes was applied to an expand grid having an area of about 148 cm$^2$, followed by aging and drying as usual to obtain positive electrodes. Four positive electrodes and five known negative electrodes were used to assemble a cell to determine its cycle life. In order to make the effect of the invention more clear, there was used a polyethylene perforated separator instead of an ordinary glass mat.

The cells or batteries thus obtained were each subjected to the repeated cycle of discharge at a current of 20 A for 1 hour and charge at a current of 5 A for 5 hours and then allowed to discharge at 20 A to a level of 1.7 V every 25 cycles.

Figure 4:
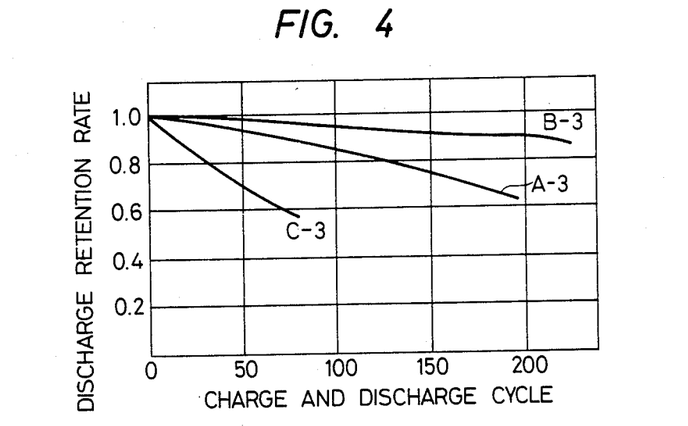
FIGS. 4 and 5 are graphical representations of a relationship between the charge retention rate and the charge and discharge cycle for lead storage batteries using different electrodes as their positive electrode.

The variarions in charge retention rate with regard to the initial capacity are shown in FIG. 4. From the results of the figure, the pastes A-3 and B-3 are superior to the paste C-3 and B-3 of the invention is superior to A-3. As described hereinbefore, this is because the active material particles are supported not only by the large network of the fluorocarbon resin but also by the polysiloxane resin porously covering the active material particles and locally combined with the fluorocarbon resin network, thereby forming a micro- and macro-protective structure.

EXAMPLE 4

According to the usual procedure, 200 cc of water and 1 kg of lead powder were pre-mixed, to which was added a one-component system cold setting silicone resin emulsion in an amount of 0.5 wt% of the lead powder, followed by mixing for about 3 minutes and then adding an aqueous dispersion of polytetrafluoroethylene in an amount of 0.5 wt% of the lead powder and (admixing with sulfuric acid) to give a paste A-4. The above procedure was repeated except that at the stage of the pre-mixing, an aqueous dispersion of polytetrafluoroethylene was first added in an amount of 0.5 wt% of the lead powder and after completion of the admixing of sulfuric acid, the aqueous emulsion of silicone resin was added in an amount of 0.5 wt% of the lead powder, followed by mixing to give a paste B-4. Moreover, a similar procedure was repeated except that the aqueous dispersion of the fluorocarbon resin and the aqueous emulsion of the silicone resin were simultaneously added at the stage of the pre-mixing in the same amounts as used above to give a paste C-4.

All of these pastes showed rubber-like elasticity which was less than that of the paste A-3 of Example 3 and were improved in applicability and fluidity over the paste A-3. Among them, the pastes B-4 and C-4 were remarkably improved in the applicability over the paste A-3.

Figure 5:
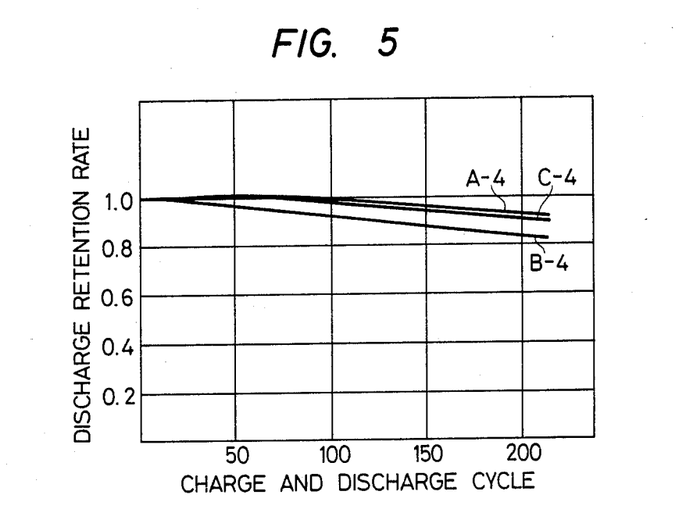

The cycle life characteristic was determined in the same manner as in Example 3 with the results shown in FIG. 5. The life characteristic of the pastes A-4 and C-4 are similar to each other and superior to the paste B-4. From this, it will be appreciated that when the silicone resin emulsion is added prior to formation of the network structure of the fluorocarbon resin, the reduction in fluidity of the paste due to the network structure of the fluorocarbon resin can be suppressed to an extent thereby improving the applicability of the paste. Accordingly, with the paste B-4 in which the aqueous silicone resin emulsion is added after formation of the fluorocarbon resin network, the undesirable plasticity of the paste is improved only in a slight degree.

The reason why the electrodes from the paste A-4 and C-4 are similar in the cycle life is considered as follows: precipitation of the silicone polymer from the aqueous emulsion during the mixing takes place only locally and the improvement in the cycle life results from the drying of the paste and in both cases, the protective structures constituted of the silicone resin covering even fine active material particles and the fluoroarbon resin network are similar to each other.

Moreover, the reason why the electrodes from the pastes A-4 and C-4 are superior in the cycle life to the electrode from the paste B-4 is believed to be as follows: the aqueous silicone resin emulsion is added prior to addition of sulfuric acid; and along with the conversion of the lead powder into lead sulfide or oxide during the mixing, the silicone resin locally precipitates as it crept into the growing active material particles and forms a strong protective layer in combination with the covering layer formed on drying.

EXAMPLE 5

A reference paste electrode was made by the procedure comprising the steps of admixing lead powder, 190 cc of water per kg of the lead powder, an aqueous dispersion of polytetrafluoroethylene in an amount of 0.1 wt%, as solid, of the lead powder, and polyethylene oxide in an amount of 0.02 wt% of the lead powder, pre-mixing them, adding sulfuric acid having a specific gravity of 1.35, mixing the mixture for a certain time to give a paste containing the fibrous network of the fluorocarbon resin, applying the paste to a lead alloy grid, and aging and drying the applied paste. The pastes obtained by mixing for times of 20 minutes and 1 hour were designated as A-5 and B-5, respectively.

The same type of one-component cold setting silicone rubber emulsion as used in the foregoing example was separately provided and diluted with water to obtain a 1:20 dilution and a 1:200 dilution. The electrodes A-5 were immersed in the respective dilutions and dried at 100 ±10° C. to obtain electrodes $A_1$-5 and $A_2$-5. Similarly, the electrodes B-5 were immersed in the respective dilutions and dried to obtain electrodes $B_1$-5 and $B_2$-5.

EXAMPLE 6

Example 5 was repeated except that the amount of the solid polytetrafluoroethylene was 0.6 wt% of the lead powder. In this case, electrodes from the pastes obtained by mixing for 20 minutes and 1 hours were designated as C-6 and D-6, respectively. These electrodes were, respectively, immersed in such 1:20 and 1:200 dilutions as used in Example 5 and dried to obtain electrodes $C_1$-6, $C_2$-6 and $D_1$-6, $D_2$-6.

Figure 6:
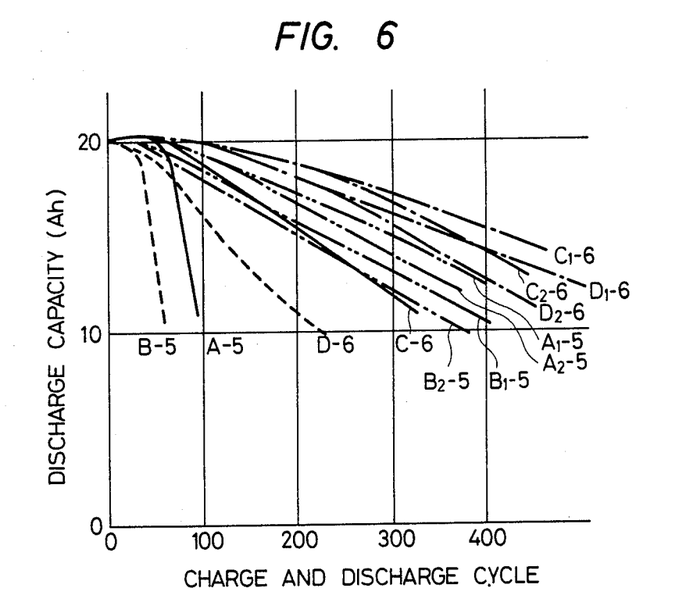
FIG. 6 is a graphical representation of a relationship between the discharge capacity and the charge and discharge cycle for different lead storage batteries using electrodes of the type applied with the fibrous network of fluorocarbon resin in combination with silicone rubber.

Each type of the electrode made in Examples 5 and 6 was used as the positive electrode to constitute a battery with a capacity of about 20 Ah using two positive electrodes and three negative electrodes. The resulting batteries were each subjected to the repeated cycle of discharge of 2.5 hours and charge of 3 hours at the five hours rate to determine a variation in capacity every 25 cycles. The results are shown in FIG. 6.

With the electrodes not treated with the silicone resin, increasing amount of polytetrafluoroethylene results in an increase of the cycle life as will be apparent on comparison of the electrodes A-5 and C-6 or B-5 and D-6. However, when the mixing conditions are not suitable, the reinforcability lowers because of breakage of the once-formed network. This is evidenced on comparison of the cycle lifes of the electrodes A-5 and B-5 or C-6 and D-6. In contrast, the electrodes incorporated with the silicone resin according to the invention are much improved in the cycle life, the extent of which varies depending on the amount of the resin applied or the dilution of the emulsion. The improving rate of the cycle life is higher in a relatively smaller content of the fluorocarbon resin. This shows that the reinforcing effect by the silicone resin is superior to that by the fluorocarbon resin. This is very important from the viewpoint of the battery characteristics. Although the cycle life increases with an increasing amount of fluorocarbon resin, use of too great an amount of fluorocarbon resin results in too high elasticity of paste and deterioration in applicability or packing property and also in deteriorated electrode characteristics because of the increase of the insulative material in electrode. In this sense, it is generally undesirable to increase the amount of fluorocarbon resin in electrode though a substantial improvement in cycle life is expected by incorporation of fluorocarbon resin. This dilemma is solved by using the silicone resin emulsion in combination with the fluorocarbon resin dispersion.

With the electrode $A_1$-5, the silicone resin emulsion was applied prior to formation. When the emulsion was applied to the electrode $A_1$-5 but after formation and washing with water, it was found that no substantial difference in cycle life was recognized. However, at the stage of the formation, solid matters were found to come off from the electrode. Thus, the aqueous silicone resin emulsion should preferably be applied prior to chemical formation.

Moreover, washing of the respective electrodes with water after completion of the cycle life test revealed that the prior-art electrodes allowed fine particles to be flown away in the form of a slurry and that particles flown away from the electrodes obtained according to the invention were very small in amounts, giving evidence that the protective structure of the silicone resin can hold such fine particles as not protected by the known fluorocarbon network.

EXAMPLE 7

This example illustrates lead storage batteries which can withstand vibrations.

1 kg of lead powder, 190 cc of water and an aqueous silicone resin emulsion (one-component cold-setting silicone rubber emulsion having a molecular weight of the rubber of $10^4$ to $10^6$ and a solid content of 45 wt% and adjusted in pH to 14 by means of NaOH) in an amount of 0.3 wt% of the lead powder as solids were added and pre-mixed, after which the mixture was kneaded or mixed while dropping 90 cc of sulfuric acid having a specific gravity of 1.35. The resulting paste was applied to a lead alloy grid and dried to give an electrode P-7.

The electrode P-7 was immersed in a 1:30 dilution of an aqueous dispersion of polytetrafluoroethylene having a solid content of 30 wt% and dried to give an electrode A-7.

The procedure for the electrode A-7 was repeated without use of the aqueous silicone resin emulsion to give an electrode Q-7. The electrode Q-7 was immersed in a 1:50 dilution of the aqueous silicone resin emulsion and dried at 100° C.±10° C. to give an electrode R-7. This electrode R-7 was immersed in a 1:30 dilution of the aqueous polytetrafluoroethylene dispersion and dried to give an electrode B-7. Furthermore, the electrode Q-7 was separately immersed in a 1:30 dilution of the polytetrafluoroethylene dispersion and dried to give an electrode C-7.

These electrodes were used to make different lead storage batteries having a ten-hours rate capacity of about 10 Ah, and these batteries were each subjected to the charge and discharge cycle test under vibrating conditions. It will be noted that in order to make clear the degree of falling-off of active material particles from the electrode, a polyethylene perforated separator was used instead of an ordinary glass mat.

Figure 7:
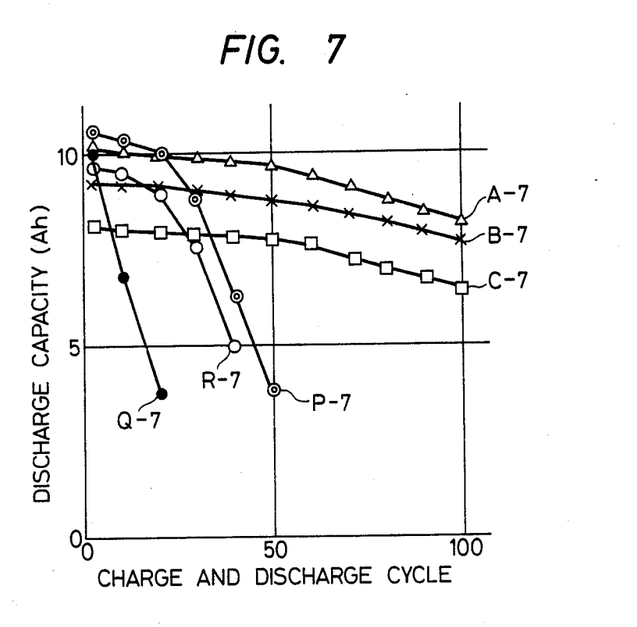
FIG. 7 is a graphical representation of a relationship between the discharge capacity and the charge and discharge cycle for different lead storage batteries using electrodes of the type in which a dispersion of resin particles inactive to the silicone rubber is applied to the silicone elastomer-containing electode.

The charge and discharge cycle test was conducted as follows: while subjecting to 30 vibrations per minute, the test battery was repeatedly discharged at a current of 10 A for 30 minutes and charged at 2 A for 3 hours and was discharged at 1 A to a level of 1 V/cell every 10 cycles to check its capacity. The results are shown in FIG. 6. In addition, the voltage at five seconds on discharge at 10 A is shown in FIG. 7.

All the electrodes except the electrode Q-7 were found to contain dimethylpolysiloxane resin therein and observed with precipitates from the silicone. With the electrodes A-7 and B-7, precipitates of the fluorocarbon resin were observed in greater amounts at portions near the surface layer.

From the figures, it will be seen that the electrode Q-7 having no protection immediately deteriorates under such severe vibrating conditions as indicated above and the electrodes P-7 and R-7 which were applied with the silicone resin emulsion are relatively poor in the cycle life under these conditions. The electrode C-7 applied with the fluorocarbon resin alone shows better cycle life than the electrodes P-7 and R-7 but its voltage characteristic is the lowest.

The electrodes A-7 and B-7 can withstand vibrations over a long term and the electrode A-7 is superior in voltage characteristic to the electrode B-7 because more porous packing is achieved with the electrode A.

This type of electrode which can withstand strong vibrations is particularly useful as a lead storage battery which is applied under vibrating conditions such as in small-size drive machines, electroautomobiles and the like.

EXAMPLE 8

An aqueous silicone resin emulsion of the same type as used in the foregoing examples was diluted with water to give a 1:5 dilution. 100 ml of the dilution was admixed with 100 g of carbon particles as core particles having a size of 100 to 200 mesh and kneaded sufficiently. This mixture was agitated to wet the carbon particles and then dropped in a drying atmosphere of 50° to 70° C. on a disc of high revolution speeds while removing the dried carbon particles. The thus obtained resin particles were mixed with lead powder, sulfuric acid and water in an amount of 5 wt% of the lead powder and the resulting paste was applied to a lead alloy grid and dried by a usual manner to obtain a pasted electrode A-8.

The general procedure as described was repeated except that iron particles with a size of 100 to 200 mesh were used and the iron particle-containing resin particles were immersed in hydrochloric acid several times to sufficiently dissolve the iron particles, washed with water until no chlorine ions were detected and dried, thereby obtaining porous elastic silicone resin particles. The particles were added to an ordinary paste of lead powder, water and sulfuric acid in an amount of 0.5 wt% of the lead powder and mixed, followed by making a pasted electrode B-8 in the same manner described above.

The electrodes A-8 and B-8 were, respectively, used to make lead storage batteries. That is, five positive electrodes, i.e. electrodes A-8 or B-8, and six commercially available negative electrodes were used to constitute a battery having a nominal rating of 35 Ah.

For comparison, the procedure for fabricating the electrode A-8 was repeated without use of carbon particles and the silicone resin emulsion thereby obtaining an electrode C-8. Moreover, the above procedure was repeated but carbon particles not applied with the silicone resin emulsion, were admixed with the paste thereby obtaining an electrode D-8. These electrodes C-8 and D-8 were also used to make batteries.

Figure 8:
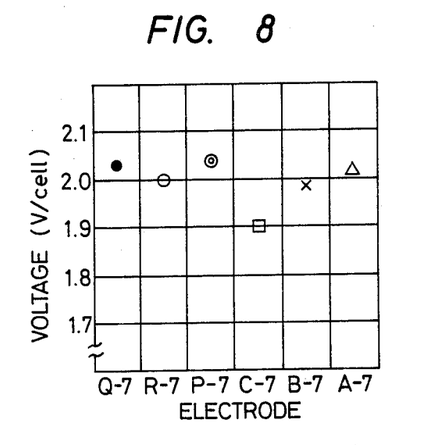
FIG. 8 is a graph showing a voltage at the high rate discharge for the batteries used in connection with FIG. 7.
Figure 9:
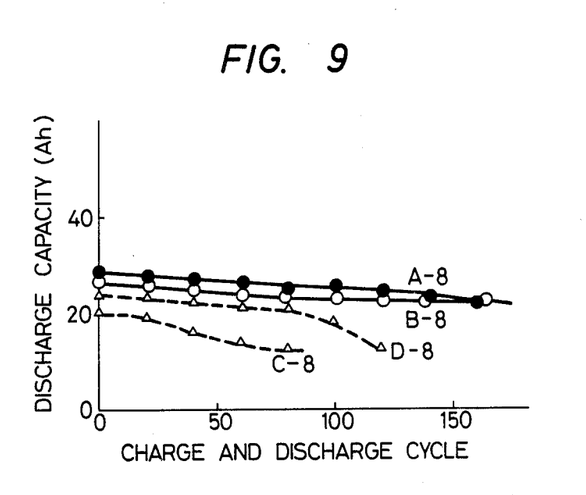
FIG. 9 is a graphical representation of a relationship between the discharge capacity and the charge and discharge cycle for electrodes of the type using silicone rubber particles.

Four types of the batteries were each subjected to a repeated cycle of discharging at 10 A for 1.5 hours and charging at 4 A for 4 hours and the capacity of each battery was measured every 20 cycles. The results are shown in FIG. 8.

As will be apparent from the figure, the batteries using the positive electrodes obtained according to the invention are excellent in both capacity and cycle life. On the contrary, the battery using the comparative electrodes D-8 is higher in capacity than that using the comparative electrodes C-8 but its capacity abruptly lowers at a certain point with an increasing amount of fallen solid matters.

What is claimed is:

1. A method for fabricating an electrode for use in lead storage batteries comprising: providing an aqueous emulsion of a silicone resin capable of forming an elastic, porous product on breaking of the emulsion; said silicone resin comprising a hydroxylated polydiorganosiloxane, contacting said silicone emulsion with a finely divided active electrode material, and drying the contacted finely divided active electrode material, so that water is removed from the aqueous emulsion to form an elastic, porous silicone rubber matrix in association with and in intimate contact with the finely divided active electrode material throughout the electrode.

2. A method according to claim 1, wherein said aqueous emulsion is a one-component aqueous emulsion of a cold setting silicone rubber having a molecular weight of $10^3$ to $10^6$.

3. A method according to claim 1 or 2, wherein the contacted system is adjusted to a pH of not less than 7.

4. A method according to claim 3, wherein the pH is adjusted by the addition of alkali metal ions.

5. A method according to claim 1, wherein the step of contacting the aqueous emulsion comprises providing an electrode having the finely divided active material supported on a support and impregnating the electrode with the aqueous emulsion.

6. A method according to claim 5, wherein the impregnated electrode is dried at a temperature of 40° to 150° C.

7. A method according to claim 5, wherein the support is a grid or a porous tube.

8. A method according to claim 5, wherein the finely divided active material is protected by an interconnected fiber structure of a fluorocarbon resin.

9. A method according to claim 8, wherein the components of the electrode are contacted with the emulsion prior to chemical formation of the electrode.

10. A method according to claim 1, wherein contact of the aqueous emulsion comprises admixing the aqueous emulsion with a paste from which the electrode is formed.

11. A method according to claim 10, wherein the emulsion is added to a mixture of a lead ingredient and water, and mixed while adding sulfuric acid.

12. A method according to claim 12, wherein the emulsion is added in an amount of 0.1 to 10 wt% of the lead ingredient as solids.

13. A method according to claim 10, wherein a water-absorptive material is added on mixing in an amount of 0.01 to 0.1 wt% of the mixture.

14. A method according to claim 13, wherein the water-absorptive material is polyethylene oxide, acryl polymer, or acrylnitrile fibers applied with acrylic acid.

15. A method according to claims 10 or 11, wherein, an aqueous dispersion of a fluorocarbon resin is also added in an amount of 0.05 to 5 wt% of the lead ingredient.

16. A method according to claim 15, wherein the aqueous emulsion of silicone is added prior to the addition of the aqueous dispersion of a fluorocarbon resin.

17. A method according to claim 1, further comprising impregnating an aqueous dispersion of resin particles, which are inert to the silicone rubber matrix, in the electrode and drying the impregnated dispersion to form a resin protective layer on or near the surface of the electrode.

18. A method according to claim 18, wherein the resin particles are made of polyethylene or a fluorocarbon resin.

19. A method for fabricating an electrode for a lead storage battery comprising contacting electrode core particles with an aqueous emulsion of a silicone, said silicone comprising a hydroxylated polydiorganosiloxane, drying the emulsion- contacted core particles to form dried core particles containing a porous silicone layer, separating the dried core particles into discrete particles covered with the porous silicone layer, admixing the discrete particles with a mixture of lead powder or paste of a lead ingredient, water and sulfuric acid, applying the mixture to a current collector, and drying the paste to give an electrode.

20. A method according to claim 19, wherein the contacted particles are dried by distributing the particles in a drying atmosphere whereby the discrete particles are obtained while drying.

21. A method according to claim 19, wherein the core particles are made of a material capable of dissolving in a suitable solvent, the discrete particles are immersed in the solvent to dissolve the core particles therein and thereby obtain porous, elastic silicone particles.

22. A method for fabricating a pasted or tubular electrode for a lead storage battery comprising admixing a one-component system aqueous emulsion of a silicone rubber having a molecular weight of $10^3$ to $10^6$, said silicone comprising a hydroxylated polydiorganosiloxane, which is capable of forming an elastic, porous silicone rubber matrix with a paste of lead powder, water and sulfuric acid, adjusting the resulting mixture to a pH of not less than 7, applying the mixture to a grid or a porous tube and drying the applied mixture to form a pasted electrode in which the lead particles are intimately contacted with and protected by a porous, elastic silicone rubber matrix in the form of single particles and secondary particles combined together.

23. A method according to claim 1 wherein the silicone emulsion is contacted with the finely divided electrode material after application to a support but prior to drying.

24. A method according to claim 1 wherein the silicone emulsion is contacted with the finely divided electrode material after application to a support and then dried.

25. A method according to claim 1 wherein the silicone emulsion is contacted with the finely divided electrode material, the contacted material is applied to a support and dried.

* * * * *